United States Patent [19]

Kubo

[11] 3,852,625

[45] Dec. 3, 1974

[54] SEMICONDUCTOR CIRCUIT

[75] Inventor: Masaharu Kubo, Hachioji, Japan

[73] Assignee: Hitachi, Ltd., Tokyo, Japan

[22] Filed: Mar. 30, 1973

[21] Appl. No.: 346,310

[30] Foreign Application Priority Data

Apr. 3, 1972 Japan .............................. 47-32651

[52] U.S. Cl. ................ 307/304, 307/205, 307/208, 307/221 C, 307/251

[51] Int. Cl. ...................... H03k 17/60, H03k 19/08

[58] Field of Search .... 307/205, 208, 221 C, 223 C, 307/238, 279, 304, 251

[56] References Cited

UNITED STATES PATENTS

| | | | |
|---|---|---|---|
| 3,267,295 | 8/1966 | Zuk | 307/221 C |
| 3,439,185 | 4/1969 | Gibson | 307/221 C |
| 3,541,353 | 11/1970 | Seelbach et al. | 307/205 X |
| 3,551,693 | 12/1970 | Burns et al. | 307/205 |
| 3,617,767 | 11/1971 | Booher | 307/221 C |

*Primary Examiner*—John Zazworsky
*Attorney, Agent, or Firm*—Craig & Antonelli

[57] ABSTRACT

A semiconductor circuit which has a first field-effect transistor of N-channel type and second and third field-effect transistors of P-channel type, each transistor having a gate, a source, a drain and a substrate, and a capacitor for storage. A series circuit is formed of the first, second and third transistors, the capacitor is connected to a connection point of the series circuit, and first and second voltage sources are connected to both ends of the series circuit. The substrates of the first and second transistors are respectively connected to the first and second voltage sources, the gates of the first and second transistors are connected to a pulse source of clock pulses, and the gate of the third transistor is connected to an input signal source.

14 Claims, 10 Drawing Figures

SEMICONDUCTOR CIRCUIT

BACKGROUND OF THE INVENTION

The present invention relates to a semiconductor circuit which employs a capacitor as storage means and which can be used as a memory circuit, an arithmetic logic circuit or the like.

As a semiconductor circuit of this type, there has heretofore been known one which comprises a capacitor for storage and three insulated gate field-effect transistors of the same channel type and the grounded substrate type, and in which the charging of the capacitor is effected via the first transistor over a predetermined time, while the discharging of the capacitor is effected by the third transistor during the conduction of the second transistor having an input signal applied thereto.

In such a semiconductor integrated circuit, however, the following problems occur:

1. Since the capacitor is connected on the source side of the first field-effect transistor, the absolute value of the terminal voltage of the capacitor during charging becomes smaller by the threshold voltage of the first transistor than the absolute value of the peak value of a pulse source connected to the first transistor. Accordingly, the circuit cannot operate with a pulse source of small peak value.

2. For the same reason as in (1), the transient response during charging requires a considerable period of time, and a high-speed operation is impossible.

3. The terminals of the respective transistors have stray capacitance, which are driven by pulses from pulse sources. This is a great burden on the load drive of the pulse sources, and increases the power consumption of the pulse sources.

SUMMARY OF THE INVENTION

A principal object of the present invention is to provide a semiconductor circuit capable of a high-speed operation.

Another object of the present invention is to provide a semiconductor integrated circuit which can be driven by small pulses.

Still another object of the present invention is to provide a semiconductor circuit which has a low amount of power consumption.

In order to accomplish such objects, the present invention consists a semiconductor circuit which comprises a pair of field-effect transistors of opposite channel types, an input circuit including at least one transistor adapted to be turned on or off in response to an input signal, and a capacitor for storage, and in which the pair of field-effect transistors and the input circuit are connected in series, the capacitor is connected on the drain side of one of the pair of field-effect transistors, and the source and substrate of each of the pair of field-effect transistors are connected in common, the source and substrate of the one transistor being connected to a source of relatively high voltage and those of the other transistor being connected to a source of relatively lowest voltage.

DETAILED DESCRIPTION OF THE INVENTION

Figure 1:
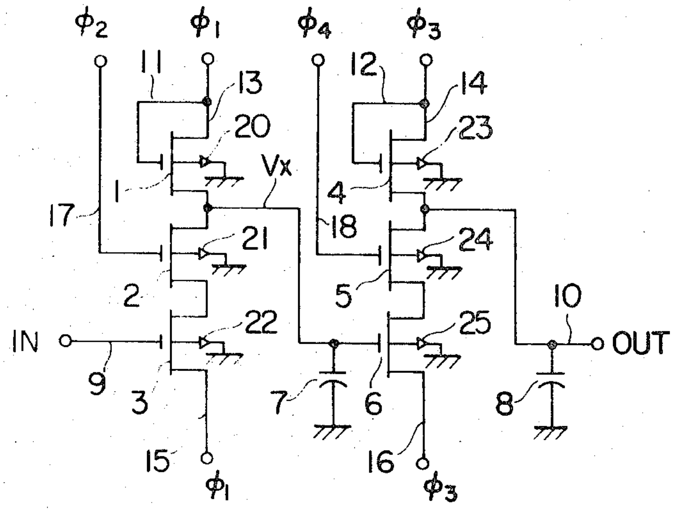
FIG. 1 PRIOR ART
FIG. 1 is a circuit diagram showing a prior-art semiconductor circuit.

FIG. 1 shows an example of a prior-art semiconductor circuit which is used as a memory circuit.

In the figure, numerals 1–6 designate insulated gate field-effect transistors which are, for example, of P-channel enhancement mode type. Shown at 7 and 8 are capacitors for storage. Numeral 9 indicates the gate electrode of the transistor 3, 10 a common electrode of the transistors 4 and 5, 11 and 12 the gate electrodes of the transistors 1 and 4, respectively, 13 and 14 the drain electrodes of the transistors 1 and 4, respectively, 15 and 16 the source electrodes of the transistors 3 and 6, respectively, and 17 and 18 the gate electrodes of the transistors 2 and 5, respectively. $\phi_1 - \phi_4$ represent pulse sources which supply predetermined clock pulses, respectively. Symbol "IN" denotes an input terminal for supplying an input signal, while symbol "OUT" indicates a terminal for taking out an output signal.

Substrates 20–25 of the transistors 1–6 are all grounded. The gate electrodes 11 and 12 of the transistors 1 and 4 are connected to the respective drain electrodes 13 and 14, which are connected to the pulse sources $\phi_1$ and $\phi_3$. The source electrodes 15 and 16 of the transistors 3 and 6 are also coupled to the pulse sources $\phi_1$ and $\phi_3$, respectively. The gate electrodes 17 and 18 of the transistors 2 and 5 are coupled to the pulse sources $\phi_2$ and $\phi_4$, respectively.

Figure 2:
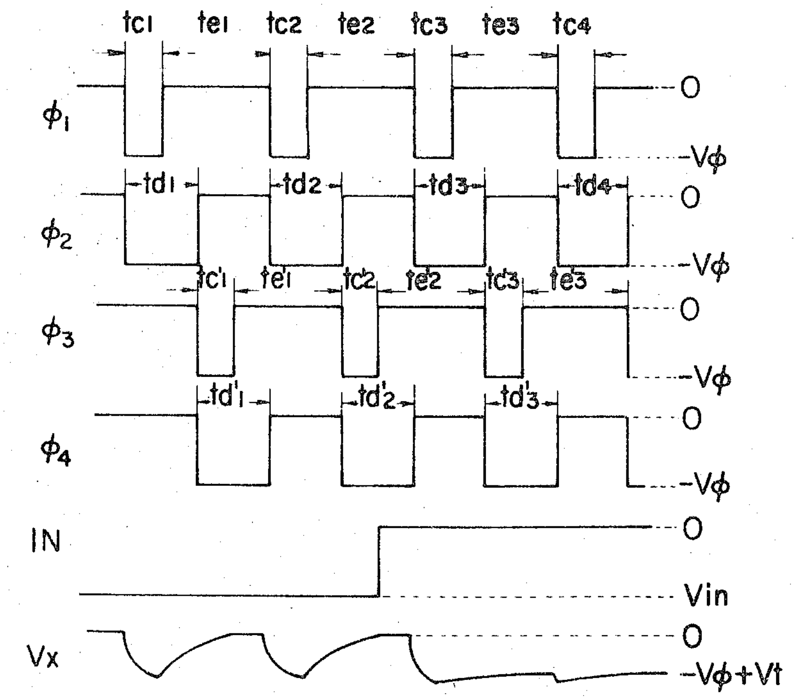
FIG. 2 PRIOR ART
FIG. 2 is a time chart showing voltage wave forms at various parts of the circuit in FIG. 1.

FIG. 2 illustrates voltage wave forms at various parts in FIG. 1. $\phi_1 - \phi_4$ and "IN" indicate the voltage wave forms of the aforesaid pulse sources and the input terminal, respectively. $V_x$ depicts the terminal voltage of the capacitor 7.

The operation of the circuit in FIG. 1 will be explained with reference to the wave forms in FIG. 2.

In general, the operating principle of a memory circuit employing a capacitor as a storage means is as explained below. First, a charging period for charging the storage capacitor is provided at every predetermined time interval. In a time period subsequent to the charging period, the presence or absence of the discharge of the charged capacitor is determined by an input signal.

In the prior-art circuit in FIG. 1, the capacitor 7 is charged through the transistor 1 by a voltage $- V\phi$ from the pulse source $\phi_1$ in time intervals $t_{c1} - t_{c4}$ at $\phi_1$ in FIG. 2. At this time, although the source electrode 15 of the transistor 3 is also connected to the identical pulse source $\phi_1$, the transistor 3 is cut-off due to an input signal $V_{in}$ from the input source "IN". The pulse width of the pulse source $\phi_2$ coupled to the gate electrode 17 of the transistor 2 is selected to be larger than that of the pulse source $\phi_1$, so that while the transistor 1 is cut off during periods $t_{e1} - t_{e4}$, during $t_{d1} - t_{d4}$ at $\phi_2$ in FIG. 2, the transistor 2 continues in the conductive state. When, at this time, the voltage of the input source "IN" is negative ($-V_{in}$) as in FIG. 2, the transistor 3 is rendered conductive, and the charges stored in the capacitor 7 are discharged through the transistors 2 and 3. On the other hand, when the voltage of the input source "IN" is at ground potential, the transistor 3 remains cut off, and the capacitor 7 accordingly holds the charge. In consequence, the terminal voltage of the capacitor 7 becomes $V_x$ in FIG. 2. As regards the capacitor 8, the charging and discharging are determined by the voltages of the pulse sources $\phi_3$ and $\phi_4$ and the terminal voltage $V_x$ on the basis of the same operating principle. Thus, one bit of the memory circuit is constructed by the capacitors 7 and 8.

The prior art circuit in FIG. 1, however, has the following problems:

1. Since the storage capacitors 7 and 8 are connected to the source electrodes of the transistors 1 and 4, respectively, the absolute value of the terminal voltage of each storage capacitor during the charging becomes smaller by the threshold voltage $V_t$ of the corresponding transistor than the absolute value of the peak value of the corresponding pulse source. Accordingly, the circuit cannot be operated by pulse sources of small peak values.

2. For the same reason, the transient response during the charging becomes long. As a result, the pulse widths of $t_{c1} - t_{c4}$ and $t_{c1}' - t_{c4}'$ in FIG. 2 cannot be made small. Accordingly, a high-speed operation is impossible.

3. The electrodes of the respective transistors have stray capacitances. In consequence, in the case of the pulse drive from the pulse sources $\phi_1$ and $\phi_3$, not only the capacitors 7 and 8, but also the drain electrode stray capacitances of the transistors 1 and 4 and the source electrode stray capacitances of the transistors 3 and 6 are driven at the same time. This exerts a great load on the load drive of the pulse sources, and increases the power consumption of the pulse sources.

Figure 3:
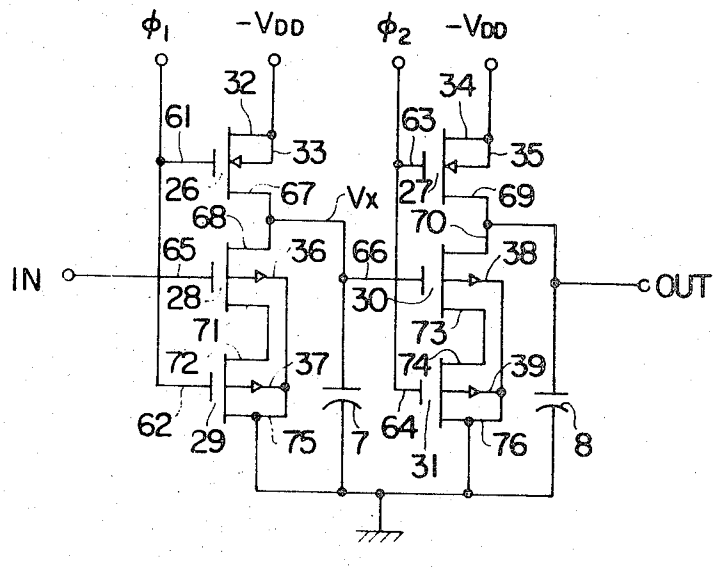
FIG. 3 is a circuit diagram showing an embodiment of a semiconductor circuit according to the present invention.

FIG. 3 is a connection diagram showing an embodiment of a semiconductor integrated circuit according to the present invention.

In the figure, reference numerals 26 and 27 designate insulated gate field-effect transistors of the N-channel enhancement mode type, while 28–31 indicate insulated gate field-effect transistors of the P-channel enhancement mode type. Shown at 7 and 8 are the same storage capacitors as in FIG. 1.

$\phi_1$ and $\phi_2$ represent pulse sources, "IN" an input terminal supplying an input signal, "OUT" a terminal for deriving an output signal, and $-V_{DD}$ a negative DC voltage source.

The source electrode 32 and the substrate 33 of the N-channel transistor 26 are connected in common, and are coupled to the negative voltage source ( $-V_{DD}$ ). Similarly, for the transistor 27, the source electrode 34 and the substrate 35 are connected in common, and are connected to the voltage source ( $-V_{DD}$ ). On the other hand, the substrates 36–39 of the P-channel transistors 28–31 are all coupled in common to ground. The respective gate electrodes 61 and 62 of the N-channel transistor 26 and the P-channel transistor 29 are coupled to the first pulse source $\phi_1$, while the respective gate electrodes 63 and 64 of the N-channel transistor 27 and the P-channel transistor 31 are coupled to the second pulse source $\phi_2$. The gate electrode 65 of the P-channel transistor 28 is connected to the input terminal "IN". On the other hand, the gate electrode 66 of the P-channel transistor 30 is coupled to one terminal of the storage capacitor 7, and is further coupled to the drain electrode 67 of the N-channel transistor 26 and the drain electrode 68 of the P-channel transistor 28 in common.

The drain electrode 69 of the transistor 27 and the drain electrode 70 of the transistor 30 are commonly connected to the output terminal "OUT". One terminal of the capacitor 8 is connected to the output terminal "OUT". The source electrode 71 of the transistor 28 and the drain electrode 72 of the transistor 29 are connected in common. Similarly, the source electrode 73 of the transistor 30 and the drain electrode 74 of the transistor 31 are connected in common. The source electrode 75 of the transistor 29, the source electrode 76 of the transistor 31 and the other terminal of each of the capacitors 7 and 8 are commonly connected to ground similarly to the substrates 36–39 of the transistors 28–31.

Figure 4:
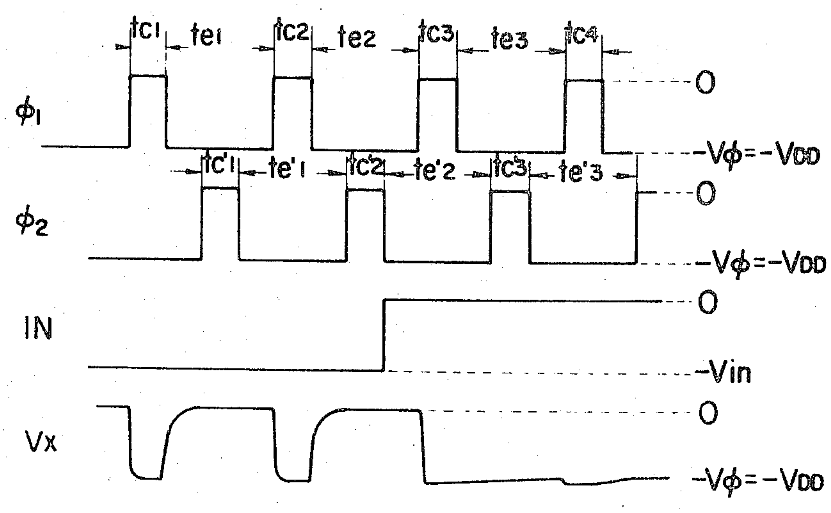
FIG. 4 is a time chart showing voltage wave forms at various parts of the circuit in FIG. 3.

FIG. 4 illustrates voltage wave forms at various parts in FIG. 3. It shows the voltages of the pulse sources $\phi_1$ and $\phi_2$, the input signal voltage of the input terminal "IN" and the terminal voltage $V_x$ of the capacitor 7.

The operation of the circuit in FIG. 3 will be explained with reference to FIG. 4.

The wave forms of the pulse sources $\phi_1$ and $\phi_2$ are so selected as to oscillate between substantially zero volts (ground potential) and the voltage of the negative voltage source ( $-V_{DD}$ ). The voltage of the pulse source $\phi_1$ is substantially zero volts during periods $t_{c1}$–$t_{c4}$. During these periods, the N-channel transistor 26 is in the conductive state, while the P-channel transistor 29 is cut-off. Therefore, the voltage of the negative voltage source ( $-V_{DD}$) is supplied through the transistor 26, to charge the storage capacitor 7 to a negative potential. Since the transistor 26 has its source electrode 32 and substrate 33 commonly connected to the negative voltage source ( $-V_{DD}$ ) and has its drain electrode 67 connected to the capacitor 7, the terminal voltage $V_x$ of the capacitor 7 is charged up to the supply voltage $-V_{DD}$ volts without any offset as is illustrated in FIG. 4.

The pulse source $\phi_1$ is at the negative voltage $-V_{DD}$ volts during periods $t_{e1} - t_{e4}$. During these periods, the N-channel transistor 26 is in the cut-off state, while the P-channel transistor 29 is in the conductive state. When, at this time, the input wave form at the input terminal "IN" is of a negative voltage $-V_{in}$ ( $= -V_{DD}$ ), the transistor 28 is conductive, and the charges stored in the storage capacitor 7 are discharged through the transistors 28 and 29. In contrast, when the input is substantially equal to ground potential voltage or zero volts, the storage capacitor 7 maintains the charges. Accordingly, the wave form of the terminal voltage $V_x$ of the capacitor 7 is as shown in FIG. 4. When note is taken of the periods $t_{e1} - t_{e4}$, $V_x$ corresponds substantially to a waveform opposite in polarity to the voltage of the input wave form. The functions of the transistors 27, 30 and 31 for the accumulating capacitor 8 are similar to those of the transistors 26, 28 and 29 for the capacitor 7. The memory circuit of one fundamental unit is constituted of the pair of capacitors 7 and 8 and the group of transistors 26 – 31.

Figure 5:
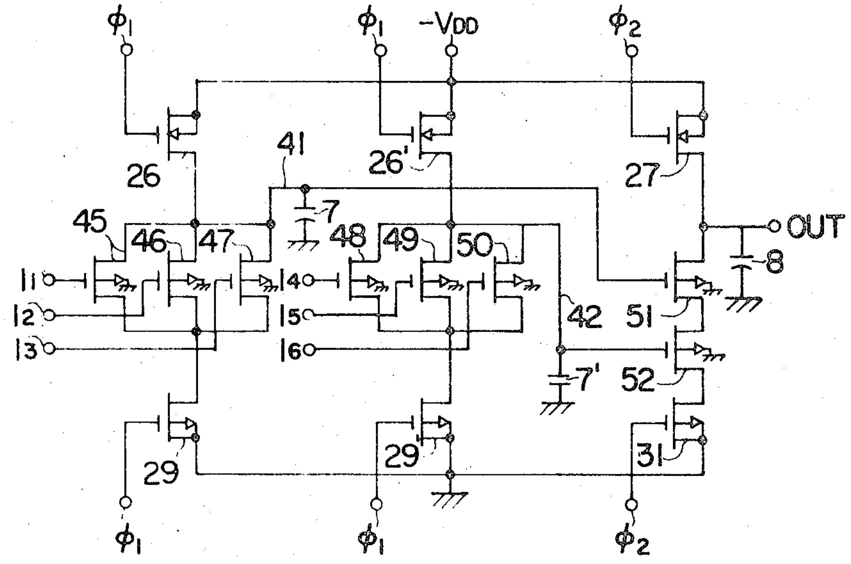
FIGS. 5, 6, and 7 are diagrams each showing another embodiment of the semiconductor integrated circuit according to the present invention.

FIG. 5 shows another embodiment of the semiconductor circuit according to the present invention, which is an example of its use as an arithmetic logic circuit.

In the figure, parts having the same operating characteristics as those in FIG. 3 have the same numerals.

26' and 29' indicate transistors effecting the same functions as the transistors 26 and 29. 7' represents a capacitor effecting the same function as the capacitor 7.

$I_1 - I_6$ designate input terminals for supplying respectively different input signals, 45 – 50 insulated gate field-effect transistors of the P-channel type respectively having the gate electrodes connected to the input terminals $I_1 - I_6$, and 51 and 52 insulated gate transistors of the P-channel type respectively having their gate electrodes connected to the terminals of the capacitors 7 and 7'.

The pulse wave forms of the pulse sources $\phi_1$ and $\phi_2$ are the same as in FIG. 4.

The drain electrodes of the transistors 45 – 47 are commonly connected to the drain electrode of the transistor 26, and to one terminal of the capacitor 7. The source electrodes of the transistors 45 – 47 are commonly connected to the drain electrode of the transistor 29. On the other hand, the drain electrodes of the transistors 48 – 50 are commonly connected to the drain electrode of the transistor 26' and to one terminal of the capacitor 7', while the source electrodes are commonly connected to the drain electrode of the transistor 29'. The substrates of the transistors 45 – 52 are grounded.

The operation of the circuit in FIG. 5 can also be explained with reference to FIG. 4. The pulse source $\phi_1$ is at zero volts during the periods $t_{c1} - t_{c4}$, during which the transistors 26 and 26' are in the conductive state, to charge the storage capacitors 7 and 7'. Subsequently, the pulse source falls to the negative voltage $-V_{DD}$ during the periods $t_{e1} - t_{e4}$, so that the N-channel transistors 26 and 26' become cut off, while the P-channel transistors 29 and 29' become conductive. The condition under which the charges are discharged from the capacitor 7, at this time, is that any of the input voltages of the input sources $I_1 - I_3$ has a value negatively larger than the threshold voltage of the elements, for example, a value approximately equal to the supply voltage $-V_{DD}$ volts. Similarly, the discharging condition of the capacitor 7' is determined by the input voltages of the input sources $I_4 - I_6$.

On the other hand, the capacitor 8 is charged through the N-channel transistor 27 during periods $t_{c1}'$ – $t_{c4}'$ in FIG. 4. The P-channel transistor 31 is conductive during periods $t_{e1}'$ – $t_{e4}'$. The discharging of the charges in the capacitor 8 depends on whether or not the preceding stages, namely, both the capacitors 7 and 7' maintain the charges, and the respective terminals 41 and 42 maintain the negative voltage $-V_{DD}$ owing to the charging. A logical arithmetic circuit which operates by a two-phase pulse source can be arranged by applying this phenomenon. More specifically, it is defined that a value negatively larger than the threshold voltage of the P-channel transistor is the logical value "1," while a value negatively smaller than the threshold voltage is the logical value "0." Then, an output $T_0$ at the output terminal of the circuit in FIG. 5 gives the following result of the operation of the inputs $I_1 - I_6$ according to Boolean algebra:

$$\overline{T_0} = \overline{\overline{(I_1 + I_2 + I_3)} \cdot \overline{(I_4 + I_5 + I_6)}}$$

Figure 6:
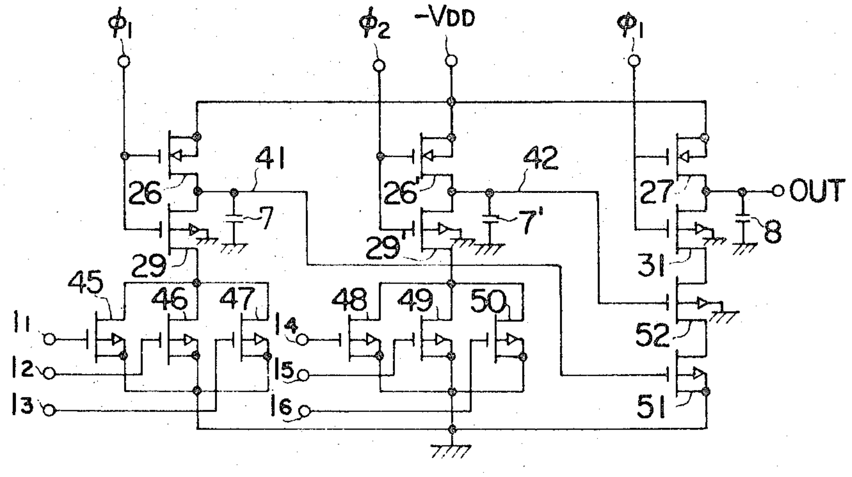

FIG. 6 is a circuit diagram showing still another embodiment of the present invention. The circuit in FIG. 6 provides an arithmetic logic circuit of the same purpose as in FIG. 5, and has the same symbols attached to elements or electrodes having the same operative functions. The difference from the embodiment in FIG. 5 is that the drain electrodes of the N-channel transistors 26, 26' and 27 are brought into the common connection with the drain electrodes of the P-channel transistors 29, 29' and 31, respectively.

The operation of the circuit is quite the same as in FIG. 5.

Figure 7:
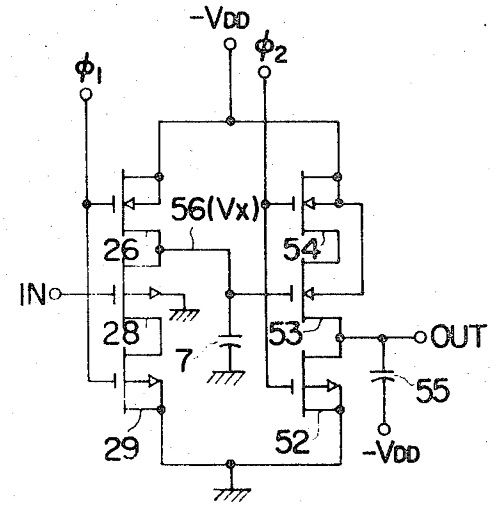
Figure 8:
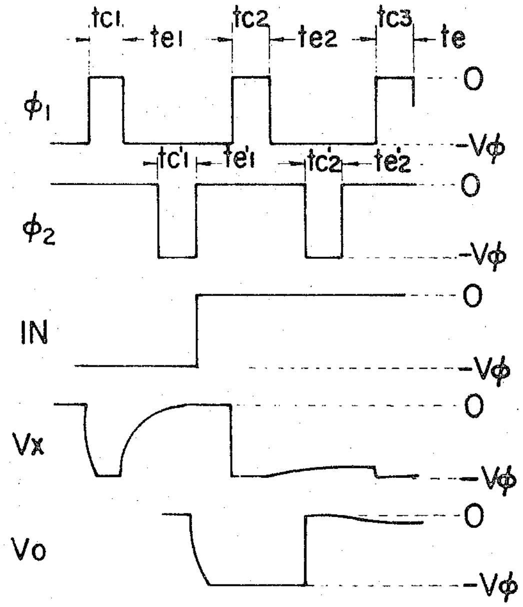
FIG. 8 is a time chart showing wave forms at various parts of the circuit in FIG. 7.

FIG. 7 is a circuit diagram of a further embodiment of the present invention. In the figure, transistors 26, 28 and 29, a storage capacitor 7 and a pulse source $\phi_1$ (as well as its pulse wave form) are the same as those in FIG. 3. Transistors 54, 53 and 52 and a capacitor 55 correspond to the transistors 27, 30 and 31 and the capacitor 8 in FIG. 3, respectively. The difference from the embodiment in FIG. 3 is that a pulse source $\phi_2$ illustrated in FIG. 8 is connected to the gate electrodes of the P-channel transistor 52 and the N-channel transistor 54. In addition, the other terminal of the storage capacitor 55 is connected to the negative voltage source ($-V_{DD}$). Further, the substrate of the transistor 53, is connected to the negative voltage source ($-V_{DD}$). With such an arrangement, the pulse source $\phi_2$ goes negative during periods $t_{c1}'$ and $t_{c2}'$ in FIG. 8, the P-channel transistor 52 becomes conductive to charge positive charges into the capacitor 55, and the voltage of the output terminal "OUT" across the capacitor 55 always goes to ground during these periods. The pulse source $\phi_2$ subsequently becomes zero volts during periods $t_{e1}'$ and $t_{e2}'$, so that the P-channel transistor 52 becomes cut off, while the N-channel transistor 54 simultaneously becomes conductive. At this time, the charges accumulated in the capacitor 55 are discharged when the output voltage of the preceding stage or a voltage $V_x$ at 56 is approximately zero volts. In contrast, when the voltage at 56 is negatively large, for example, $-V_{DD} = -V_\phi$ volts, the charges are held undischarged, and the terminal voltage of the capacitor 55 is maintained at approximately zero volts. In this way, the circuit in FIG. 7 can provide a memory circuit of unit bit similarly to the circuit in FIG. 3. $V_0$ in FIG. 8 indicates the output voltage of the output terminal "OUT".

Figure 9:
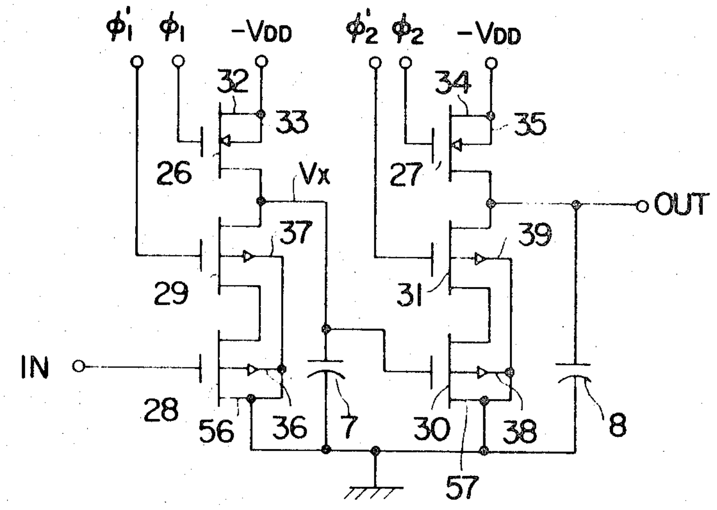
FIG. 9 is a diagram showing still another embodiment of the semiconductor integrated circuit according to the present invention.

FIG. 9 is a circuit diagram showing a still further embodiment of the present invention. In the figure, transistors 26 – 31, storage capacitors 7 and 8, etc., correspond to the respective constituents of the embodiment in FIG. 3. In the circuit in FIG. 9, the gate electrodes of the N-channel transistor 26 and the P-channel transistor 29 and those of the N-channel transistor 27 and the P-channel transistor 31 have pulse sources $\phi_1$, $\phi_1'$, $\phi_2$, and $\phi_2'$, as shown in FIG. 10, independently respectively connected thereto.

Figure 10:
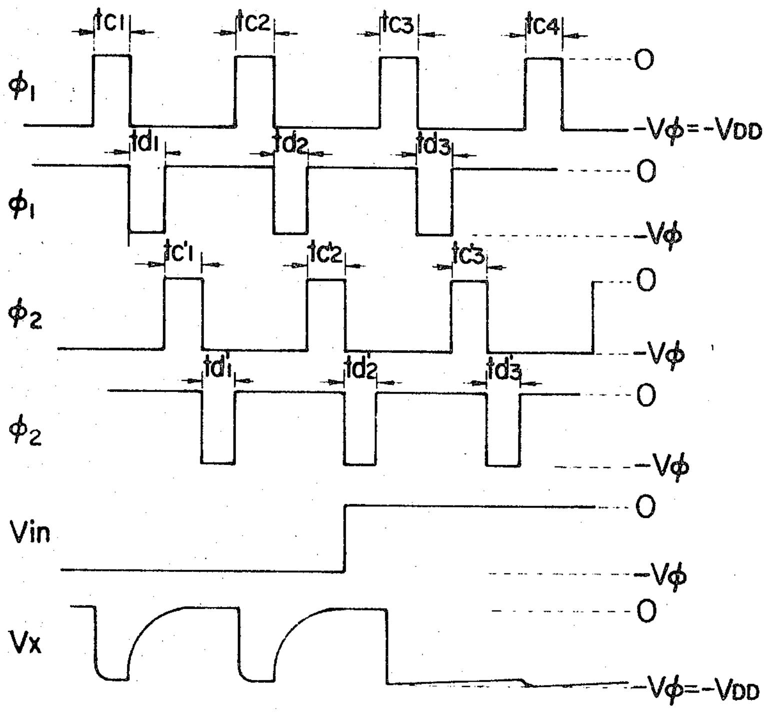
FIG. 10 is a time chart showing voltage wave forms at various parts of the circuit in FIG. 9.

When, in the embodiment in FIG. 9, a wave form at $V_{in}$ in FIG. 10 is applied to the input terminal "IN" connected to the gate electrode of the transistor 28, the wave form of the output $V_x$ of the first stage becomes as shown in FIG. 10.

Since the operation of the circuit is substantially the same as in FIG. 3, an explanation thereof will be omitted.

Of course, in the embodiments of FIGS. 5 – 7, a method in which independent pulse sources are provided for the gate electrodes of the paired transistors as set forth above can be employed.

In accordance with the present invention, there are obtained the advantages as mentioned below:

1. Since a transistor for storing charges into a storage capacitor has its source electrode and substrate commonly connected to a power source and has its drain electrode connected to the capacitor, the capacitor can be charged up to the peak value of a pulse source or a voltage value equal to the supply voltage. Accordingly, when a source of the same voltage or a pulse source of the same peak value as in the prior-art circuit is employed, no attenuation of signals occurs. In other words, according to the present invention, the circuit can be operated by a lower voltage source or a pulse source of smaller peak value.

2. For the same reason as in (1), the transient charging characteristic for the accumulating capacitor is 5 – 10 times faster than in the prior-art circuit. Therefore, the pulse width of the pulse source can be made smaller to that extent, and a high-speed operation can be realized.

3. The source electrode and substrate of each of the transistors 26, 27, etc., are connected to a fixed voltage source, and the load of the load drive of the pulse source is reduced. Thus, the cost of the pulse source is lowered, and the power consumption of the pulse source can be saved.

Although the above description has been made of the case of employing the insulated gate field-effect transistors 26 and 29 of enhancement mode type, depletion mode type may also be used. In addition, the insulated gate type is not restrictive, but any paired field-effect transistors having opposite conductivity types of P-channel and N-channel types may be employed.

The P-channel type may be used for the transistor 26, while the N-channel type for the transistor 29. In this case, it is necessary that the substrate of the P-channel transistor be connected to a source of relatively high voltage, while the substrate of the N-channel transistor is connected to a source of relatively low voltage. In this case, accordingly, the substrate of the transistor 26 is grounded, while that of the transistor 29 is connected to a negative voltage source.

Furthermore, the voltage sources can be selected at any other suitable values without utilizing the negative voltage source and ground.

Furthermore, the transistor 28 connected to the input source is not restricted to field-effect transistors illustrated in the foregoing embodiments, but any transistor may be employed insofar as it effects a switching operation by an input signal.

What is claimed is:

1. A semiconductor circuit, comprising:

a first field-effect transistor of the N-channel type and a second field-effect transistor of the P-channel type each of which has a gate, a source, a drain and a substrate;

an input circuit which includes at least one transistor adapted to effect switching in response to an input signal, and which has an input terminal for coupling said input signal to said transistor and first and second output terminals;

a capacitor, one terminal of which is connected to said drain of said first transistor;

means for coupling said drain of said first transistor to the first output terminal of said input circuit;

means for connecting said drain of said second transistor to the second output terminal of said input circuit;

a first voltage source for supplying a relatively low voltage, which is commonly connected to said source and substrate of said first transistor;

pulse supply means which is connected to said gates of said first and second transistors, and which supplies predetermined clock pulses thereto;

a second voltage source for supplying a relatively high voltage, which is commonly connected to said source and substrate of said second transistor;

at least one input source which supplies the input signal to said input terminal of said input circuit; and means for connecting the other terminal of said capacitor to said second voltage source.

2. The semiconductor circuit according to claim 1, wherein said pulse supply means comprises a first pulse source which is connected to said gate of said first transistor and which supplies pulses of a predetermined period, and a second pulse source which is connected to said gate of said second transistor and which supplies pulses having the same period as said pulses of said first pulse source and being shifted in time with respect thereto.

3. The semiconductor circuit according to claim 1, wherein said input circuit comprises a P-channel field-effect transistor having a gate, a source, a drain and a substrate, and wherein said gate thereof is connected to said input terminal, said source thereof is connected to said drain of said second field-effect transistor, said drain thereof is connected to said drain of said first field-effect transistor, and said substrate is connected to said second voltage source.

4. A semiconductor circuit according to claim 1, wherein said input circuit comprises a plurality of P-channel field-effect transistors each having a gate, a source, a drain and a substrate, and wherein the gates thereof are connected to a respective plurality of different input sources, said sources are commonly connected to said drain of said second transistor, said drains are commonly connected to said drain of said first transistor, and said substrates are commonly connected to said second voltage source.

5. A semiconductor circuit, comprising:

a first field-effect transistor of the N-channel type and a second field-effect transistor of the P-channel type each of which has a gate, a source, a drain and a substrate;

an input circuit which includes at least one transistor adapted to effect switching in response to an input signal, and which has an input terminal for supplying said input signal to said transistor and first and second output terminals;

a capacitor, one terminal of which is connected to said drain of said first transistor;

first connection means for connecting said drain of said first transistor to said drain of said second transistor;

a first voltage source for supplying a relatively low voltage which is commonly connected to said source and substrate of said first transistor;

second connection means for connecting said source of said second transistor to said first output terminal of said input circuit;

a second voltage source for supplying a relatively high voltage, which is connected to said second output terminal of said input circuit, said substrate of said second transistor and the other terminal of said capacitor;

pulse supply means, connected to said gates of said first and second transistors, for supplying predetermined clock pulses; and at least one input source which is connected to said input terminal of said input circuit, and which supplies the input signal thereto.

6. The semiconductor circuit according to claim 5, wherein said pulse supply means comprises a first pulse source which is connected to said gate of said first transistor and which supplies pulses of a predetermined period, and a second pulse source which is connected to said gate of said second transistor and which supplies pulses having the same period as said pulses of said first pulse source and being shifted in time with respect thereto.

7. The semiconductor circuit according to claim 5, wherein said input circuit comprises a plurality of third field-effect transistors of the P-channel type each having a gate, a source, a drain and a substrate, and wherein the respective gates thereof are connected to the corresponding input sources, said drains thereof are commonly connected to said source of said second transistor, and said sources and substrates thereof are commonly connected to said second voltage source.

8. The semiconductor circuit according to claim 6, wherein the pulses of said second pulse source are of a polarity opposite to those of said first source.

9. A semiconductor circuit comprising:

a first field-effect transistor of a predetermined conductivity type channel, having a gate, a source, a drain and a substrate;

a second field-effect transistor of an opposite conductivity type channel with respect to that of said first field-effect transistor, having a gate, a source, a drain and a substrate;

an input circuit which includes at least one transistor adapted to effect switching in response to an input signal and which has an input terminal for coupling said input signal to said transistor and first and second output terminals;

first connection means for connecting one of said source and drain of said second field-effect transistor to one of said output terminals of said input circuit to thus form a first series circuit;

second connection means for connecting said drain of said first field-effect transistor to one end of said first series circuit to thus form a second series circuit;

first voltage supply means being connected to said source and substrate of said first field-effect transistor;

second voltage supply means being connected to the other end of said first series circuit;

capacitor means, one terminal of which is connected to said drain of said first field-effect transistor, the other terminal of which is connected to said second voltage supply means, for charging a voltage from said first voltage supply means through said first field-effect transistor and discharging stored charge through said first series circuit;

pulse supply means which is connected to said gates of said first and second field-effect transistors and which supplies predetermined clock pulses thereto;

input supply means for supplying said input signal to said input terminal of said input circuit; and third connection means for connecting said substrate of said second field-effect transistor to said second voltage supply means.

10. A semiconductor circuit according to claim 9, wherein said first and second field-effect transistors are of N-channel type and P-channel type, respectively, and wherein said source and substrate of said first field-effect transistor are connected to said first voltage supply said second field-effect transistor is connected to said second voltage supply means for supplying a relatively high voltage.

11. A semiconductor circuit comprising:

at least one multiple transistor circuit having a first field-effect transistor of a predetermined conductivity type channel, having a gate, a source, a drain and a substrate;

a second field-effect transistor of an opposite conductivity type channel with respect to that of said first field-effect transistor, having a gate, a source, a drain and a substrate;

an input circuit which includes at least one transistor adapted to effect switching in response to an input signal and which has an input terminal for coupling said input signal to said transistor and first and second output terminals;

first connection means for connecting one of said source and drain of said second field-effect transistor to one of said output terminals of said input circuit to thus form a first series circuit;

second connection means for connecting said drain of said first field-effect transistor to one end of said first series circuit to thus form a second series circuit;

first voltage supply means being connected to said source and substrate of said first field-effect transistor;

second voltage supply means being connected to the other end of said first series circuit;

capacitor means, one terminal of which is connected to said drain of said first field-effect transistor, the other terminal of which is connected to said second voltage supply means, for charging a voltage from said first voltage supply means through said first field-effect transistor and discharging stored charge through said first series circuit;

pulse supply means which is connected to said gates of said first and second field-effect transistors and which supplies predetermined clock pulses thereto;

input supply means for supplying said input signal to said input terminal of said input circuit; and third connection means for connecting said substrate of said second field-effect transistor to said second voltage supply means.

12. The semiconductor circuit according to claim 11, comprising first and second multiple transistor circuit, with the capacitor of said first multiple transistor circuit being connected to the input supply means of said second multiple transistor circuit and wherein the pulse supply means of said second multiple transistor circuit supplies pulses having the same period as the pulses of the pulse supply means of said first multiple transistor circuit and being shifted in time with respect thereto.

13. The semiconductor circuit according to claim 11, wherein the capacitor of said first multiple transistor circuit is connected to one of said first and second voltage supply means and the capacitor of said second multiple transistor circuit is connected to the other of said voltage supply means.

14. The semiconductor circuit according to claim 13, comprising first and second multiple transistor circuit, with the capacitor of said first multiple transistor circuit being connected to the input supply means of said second multiple transistor circuit and wherein the pulse supply means of said second multiple transistor circuit supplies pulses having the same period as the pulses of the pulse supply means of said first multiple transistor circuit and being shifted in time with respect thereto, and wherein the pulses of the pulse supply means of said second multiple transistor circuit have a polarity opposite to those of the pulse supply means of said first multiple transistor circuit.

* * * * *